United States Patent [19]
Littmann

[11] 3,790,209
[45] Feb. 5, 1974

[54] NON-DETACHABLE SNAP-LOCK CONNECTOR FOR COMBINATION SHOULDER AND LAP SAFETY HARNESS

[75] Inventor: Joseph C. Littmann, Northridge, Calif.

[73] Assignee: American Safety Equipment Corporation, New York, N.Y.

[22] Filed: Sept. 14, 1972

[21] Appl. No.: 289,079

[52] U.S. Cl............ 297/389, 24/224 LS, 24/230 A
[51] Int. Cl............................................ A62b 35/60
[58] Field of Search...............297/389, 388, 384; 280/150 SB; 24/75 R, 224 R, 224 LS, 224 SS, 222 BS, 230 A

[56] References Cited
UNITED STATES PATENTS

| | | | |
|---|---|---|---|
| 1,930,603 | 10/1933 | White............................. | 24/224 LS |
| 2,097,018 | 10/1937 | Chamberlin..................... | 24/224 LS |
| 2,239,004 | 4/1941 | Jung................................ | 24/224 LS |
| 3,369,842 | 2/1968 | Adams et al..................... | 297/389 |
| 3,378,301 | 4/1968 | Romanzi, Jr. et al............ | 297/389 |
| 3,457,603 | 7/1969 | Romanzi, Jr. et al............ | 297/389 |
| 3,583,764 | 6/1971 | Lohr et al....................... | 297/389 |
| 3,680,914 | 8/1972 | Stephenson..................... | 297/389 |

*Primary Examiner*—James T. McCall
*Attorney, Agent, or Firm*—C. A. Miketta et al.

[57] ABSTRACT

A non-detachable snap-lock connector is provided to facilitate installation of a combination shoulder harness and lap harness vehicle restraint system, in which the shoulder and lap harness assemblies may be manufactured, shipped and mounted in a vehicle as separate unconnected components and as a final assembly step the shoulder harness is irreversibly permanently snap-locked to the lap unit by means of the provided connector. In this safety restraint system, the shoulder harness must be worn along with the lap restraint, thus necessitating a permanent non-detachable connection of an end of the shoulder harness to the lap buckle or tongue plate such that the user does not have the option of disconnecting the shoulder strap and using only the lap harness. By means of the disclosed non-detachable snap-lock connector, installation is completed by a quick coupling engagement of fitting means forming the connector and carried by the portions of the shoulder and lap harnesses to be permanently joined. The connector itself is provided by a first fitting affixed to one of the harnesses, such as the shoulder strap, and a second fitting carried by a tongue plate of a buckle tongue plate combination in the lap restraint unit, and a unidirectional spring lock means disposed therebetween and functioning to irreversibly lock the fittings together upon movement thereof into coupling engagement.

9 Claims, 8 Drawing Figures

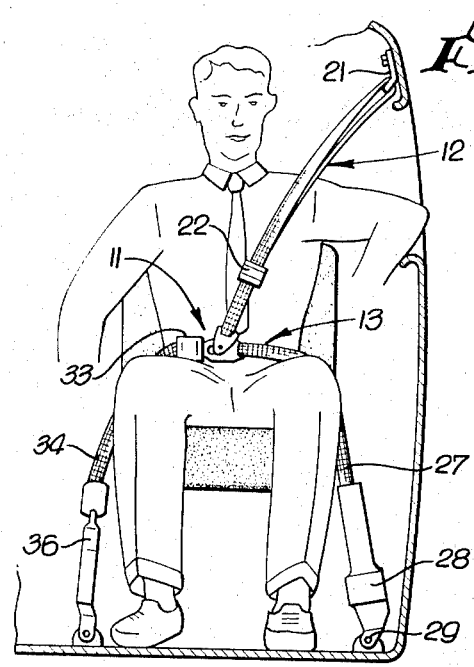
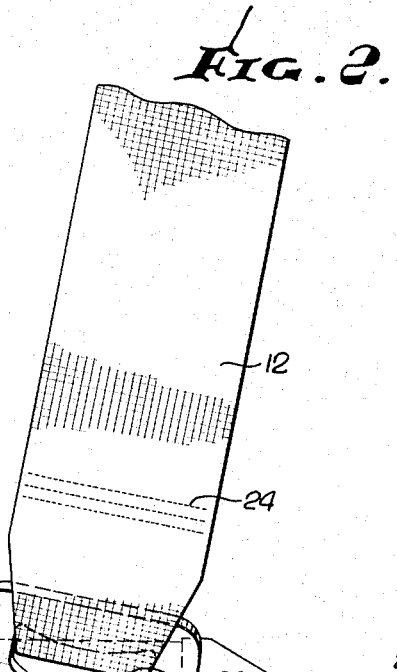
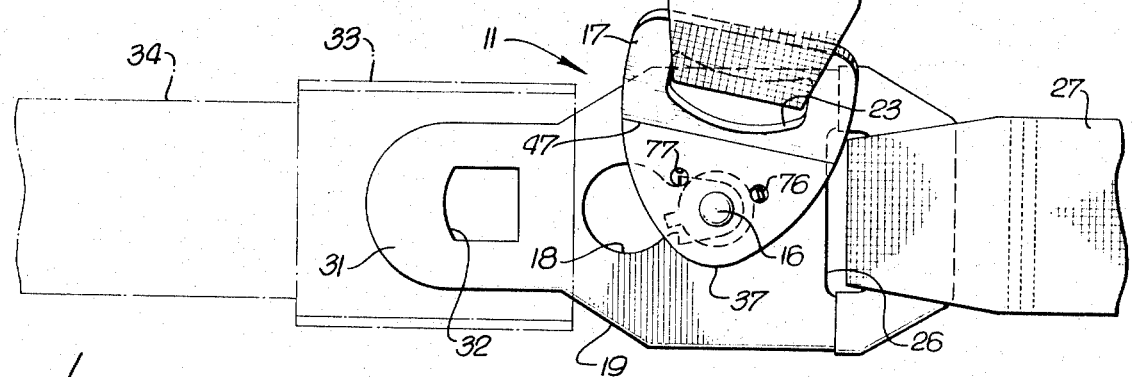
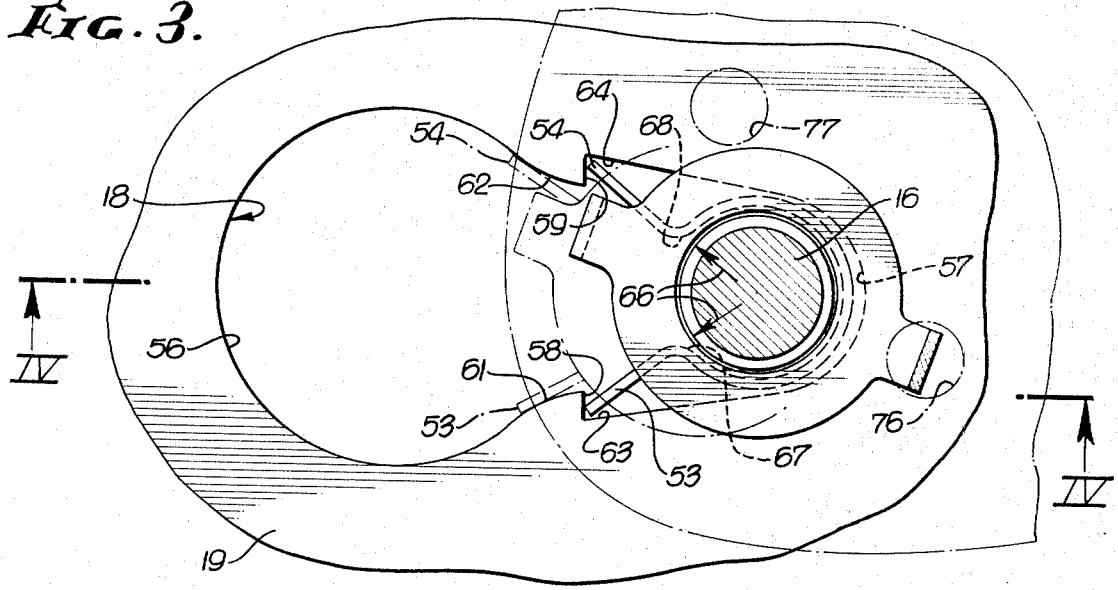

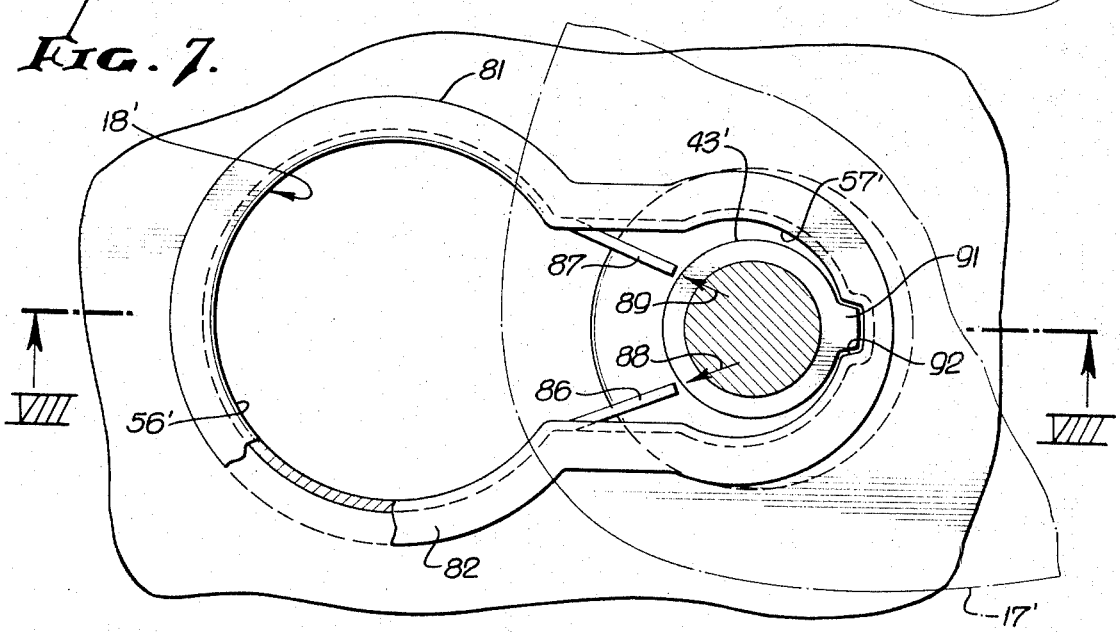

3,790,209

NON-DETACHABLE SNAP-LOCK CONNECTOR FOR COMBINATION SHOULDER AND LAP SAFETY HARNESS

BACKGROUND OF THE INVENTION

The present invention relates to safety restraint systems for use in all types of vehicles and in particular for use in conventional passenger automobiles.

As the safety attributes of combination lap and shoulder harness restraint systems for passengers automobiles is increasingly recognized, manufacturers of automobiles and safety equipment have been pressed to develop safety restraint systems which force the use of the restraint by the automobile passenger. With respect to the present invention, one aspect of this policy has been to require that combination lap and shoulder harnesses be constructed such that the shoulder harness must be worn along with the lap belt or restraint unit. Previously, many automobiles were equipped with an optional shoulder harness, in which the shoulder strap could be disconnected from the restraint system such that the passenger could use only the lap belt if he desired. However, in a must-be-worn system, the shoulder strap is permanently attached to the lap restraint, so that if the lap restraint is used, the shoulder strap is also necessarily worn. Other devices, collateral to the present invention, have been devised for encouraging and in some cases even requiring the passenger to connect his lap restraint unit before setting the vehicle in motion.

Examples of optional shoulder strap systems are illustrated in U.S. Pat. Nos. 3,369,842 and 3,378,301. One of the embodiments of the adapter or connector assembly shown in U. S. Pat. No. 3,369,842 provides a semi-permanent connection of the shoulder harness to the lap belt, however even that connection may be released by unscrewing a bolt and nut assembly. Moreover, such a semi-permanent shoulder harness to lap belt connection has the disadvantage of requiring a substantial amount of assembly time during installation of the restraint system.

It is desirable that the lap harness assembly and the shoulder harness be mounted as separate units to the automobile body while the vehicle is on the assembly line. Otherwise, a permanent junction at the three point connection between the shoulder strap and lap unit tends to cause entanglement of the various belt or strap sections slowing down the assembly operation. Also, with a permanent three point connection provided prior to installation, the ends of the lap and shoulder harnesses are likely to be anchored without complete untangling the harnesses, thus leaving one or more permanent twists in the strap or belt sections. For these reasons, permanent connection of the shoulder strap to the lap restraint at the place of manufacture of the restraint system is sometimes undesirable.

SUMMARY OF THE INVENTION AND ITS OBJECTIVES

Accordingly it is an object of the present invention to provide a quickly assembled non-detachable connection between the shoulder and lap harness of a combination shoulder and lap safety restraint system to facilitate installation of the restraint system in a vehicle.

It is another object of the present invention to provide a method for installing a combination shoulder harness and lap restraint safety system in a vehicle, in which the installation can be quickly effected without likelihood of entanglement of the various strap and belt sections.

A further object of the present invention is to provide a less expensive and easier to manufacture connection means for permanently joining a shoulder harness to a lap restraint in a combination shoulder and lap safety harness system.

An additional object of the present invention is to provide such a connector in which the non-detachable snap-lock features thereof are provided together with the ability of the connector to sustain substantial and sudden loads which may occur during emergency restraint condition.

These objects are achieved in accordance with the present invention by a connector having a first fitting means fixedly carried at the unanchored end of a shoulder strap and a second fitting means fixedly carried by the lap restraint, such as at the buckle-tongue plate assembly, with the first fitting being movable into coupling engagement with the second fitting. A unidirectional spring lock means is associated with the first and second fittings to provide for irreversibly locking the fitting means together pursuant to a quick snap-action movement into coupled engagement. This non-detachable snap-lock connector in combination with the shoulder and lap restraint system, permits the shoulder harness and lap harness or belt to be anchored in the vehicle as separate unconnected assemblies and thereafter irreversilby connected by a single quick assembly step in which the first and second fitting means are snapped into coupling engagement. No time consuming assembly operation is required for installation. Moreover, the individual shoulder and lap units may be manufactured, shipped and mounted in the vehicle separately while the vehicle is on the assembly line, so as to avoid entanglement and twisting of the various straps and belts during installation.

These and further objects and various advantages of the invention will become apparent to those skilled in the art from a consideration of the following detailed description of an exemplary embodiment thereof. Reference will be made to the appended sheets of drawings in which:

BRIEF DESCRIPTION OF THE DRAWINGS:

FIG. 1 is a front elevation view of a combination shoulder harness and lap harness or belt safety restraint apparatus including the non-detachable snap-lock connector constructed and arranged according to the present invention;

FIG. 2 is an enlarged plan view of a preferred form of the connector in accordance with the present invention mounted between an end of the shoulder strap or harness and to a point on a tongue plate of the buckle-tongue plate assembly associated with the lap belt or harness.

FIG. 3 is a fragmentary further enlarged view of the connector shown in FIG. 2 in which a fitting plate affixed to the shoulder harness is in phantom.

FIG. 4 is a fragmentary cross-sectional view taken along the planes IV—IV of FIG. 3.

FIG. 5 is a perspective view of a rotation limiting washer employed in the connector of FIGS. 2 through 4.

FIG. 6 is a perspective view of a split ring spring member forming a component of the unidirectional spring lock of the connector of FIGS. 2 through 4.

FIG. 7 is an enlarged fragmentary plan view, partially in phantom, of a preferred alternative construction of the non-detachable snap-lock connector in accordance with the present invention.

FIG. 8 is a fragmentary sectional view taken along the plane VIII—VIII of FIG. 7.

DESCRIPTION OF THE PREFERRED EMBODIMENTS:

With reference to FIGS. 1 through 4, a shoulder harness and lap belt or harness safety restraint system of the type illustrated in FIG. 1 is constructed to comprise in accordance with the present invention a non-detachable snap-lock connector 11 for permanently attaching an end of a shoulder strap or harness 12 to a lap belt or harness assembly 13. The combination shoulder harness 12 and lap harness 13 as illustrated in FIG. 1 is sometimes referred to as a three-point anchorage system.

The preferred embodiment of connector 11 is illustrated in FIG. 2, in which a first fitting means in the form of a pin 16 transversely affixed to a plate 17 is carried at the unanchored end of shoulder harness 12 for irreversible coupling to a second fitting means, here in the form of a bayonet-like opening 18 within a portion of a tongue plate 19 forming part of the lap restraint harness 13. A unidirectional spring lock means is provided within the smaller end of bayonet-like opening 18, such that an enlarged head portion of pin 16 may be passed through the larger end portion of opening 18 and manipulated laterally into irreversible coupling engagement within the smaller end of the opening 18.

Shoulder harness 12, except for the fitting carried at the end thereof, is conventional and may be provided by a strap of suitable strength anchored at an upper end by a conventional bracket 21 secured to the vehicle frame or other suitable support. A conventional strap length adjustment means 22 may be provided. At the connector end of shoulder harness 12, fitting plate 17 is provided with a strap receiving aperture 23 such that the end of the strap forming harness 12 may be passed through aperture 23 and permanently secured to plate 17 by sewing as indicated at 24.

Similarly, except for the special fitting at bayonet-like opening 18 of tongue plate 19, the lap restraint or harness 13 is of conventional construction. One end of tongue plate 19 may be provided with a belt receiving aperture 26 to which an end of a lap belt 27 may be permanently attached. The other end of lap belt 27 may be fastened with a retraction mechanism 28 to a floor anchorage through a pivotal fitting 29 as known. Retraction mechanism 28 is adapted to retract the belt 27 when not in use and to hold it in locked extended position when in use in a manner well known in the art.

The opposite end of tongue plate 19 is formed with a protruding tongue portion 31 having an aperture 32 for selectively locking with a movable pawl (not shown) carried by a buckle 33 shown in phantom in FIG. 2. Buckle 33 is permanently affixed to another lap belt 34, shown in FIG. 2 in phantom, which is anchored at the non-buckle end to the floor of the vehicle through a conventional fitting 36 as shown in FIG. 1. Buckle 33 and the tongue plate portion 31 of tongue plate 19 may be provided by any conventional safety connection device, including the commonly used metal-to-metal safety connectors in which the tongue plate may be lockingly engaged to the buckle by pushbutton or pivotal handle means.

With reference to FIGS. 2 through 6, transverse pin 16 is here secured to shoulder harness fitting plate 17 adjacent a bluntly pointed end portion 37 thereof by passing a reduced diameter shank portion 38 of pin 16 through a plate opening 39 and riveting the end of shank portion 38 protruding from an upper surface 42 of plate 17 so as to form a shoulder 41 abutting the surface. A relatively larger diameter shank portion 43 adjacent an opposite and lower surface 44 of plate 17 provides a shoulder 46 opposing shoulder 41 and securing the pin to the plate. The end portion of plate 37 may be slightly bent, such as by 15° to 20° along a bend line 47 shown in FIG. 2 so as to slope the portion of fitting plate 17 connected to the strap of harness 12 upwardly and away from the plane defined by tongue plate 19. This positions aperture 23 and moreover the shoulder strap section connected thereto away from the plane defined by the lower surface 44 of plate 17 so as not to obstruct with the coupling of pin 16 in the bayonet-like opening 18 of tongue plate 19.

As will be seen the larger diameter shank portion 43 of pin 16 provides a cylindrical body which is engaged by and locked in place by the unidirectional spring lock means provided within the smaller end of bayonet opening 18. Pin 16 also has an enlarged head portion 48 offset from surface 44 of the body of plate 17 by shank portion 43 as best illustrated in FIG. 4.

As both plate 17 and pin 16 are load-bearing members they must be formed of materials of suitable strength. Plate 17 may be provided of a SAE 4130 H.R. 0.09 inches thick heat treated steel and may be chrome plated. Pin 16 may be formed of a SAE 30305 CRES. steel with a passivate finish.

In the preferred embodiment of the invention illustrated in FIGS. 3 through 6, the unidirectional spring lock means is provided by a split ring spring member 51 having an "Omega" shape including a partially enclosed ring portion 52 dimensioned to circumferentially fit around shank portion 43 of pin 16 and having a pair of radially outwardly bent legs 53 and 54 joined to ring portion 52 at the split or break therein. During manufacture of the connector, portion 52 of member 51 is snapped on pin 16. Accordingly, when pin 16 is moved into coupling engagement with the bayonet-like opening 18, head portion 48 of the pin is passed through an enlarged end 56 of the opening, disposing member 51 in the plane thereof. Legs 53 and 54 are oriented at this time so as to extend away from the reduced end 57 of opening 18. Unidirectional lateral movement of pin 16 toward reduced end 57 is provided by the orientation of legs 53 and 54 of split ring member 51 relative to a pair of abutments or shoulders 58 and 59 formed at opposed lateral locations along the perimeter of opening 18 intermediate the ends thereof. Shoulders 58 and 59 face to the rear of reduced end 57 such that a completed movement of pin 16 and member 51 into reduced end 57 causes the ends of legs 53 and 54 to catch on shoulders 58 and 59 locking shank portion 43 of the pin in place.

In particular, legs 53 and 54 as shown in phantom in FIG. 3 are outwardly biased against curvilinear camming surfaces 61 and 62 of opening 18 forward of shoulders 58 and 59. During this stage, the legs of member 51 assume a pure bending mode in which they are cammed or pinched inwardly by converging camming surfaces 61 and 62 during the lateral coupling movement. This inward pinching of legs 53 and 54 continues until the ends thereof pass shoulders 58 and 59 whereupon the ends of the legs fly outwardly to abut inwardly facing surfaces 63 and 64 of opening 18 adjacent shoulders 58 and 59 and rearward thereof. Now the ends of legs 53 and 54 are locked in place by the generally right angle corners defined by the intersection of shoulders 58 and 59 and surfaces 63 and 64 respectively.

Thereafter, attempted movement of pin 16 toward enlarged end 56 of bayonet-like opening 18 places each of legs 53 and 54 in an unyielding substantially pure compression mode generally along axes indicated by arrows 66. Accordingly, the interior surfaces of ring portion 52 adjacent legs 53 and 54 provide abutments 67 and 68 against which the circumference of shank portion 43 of the pin is restrained.

Split-ring spring member 51 is formed of a material, such as SAE 1095 steel, and is dimensioned so as to permit some bending of and yet withstand a substantial compression force in legs 53 and 54 prior to yielding. For the present embodiment, a rectangular cross-section may be employed for member 51 having a thickness of 0.02 inches, a diameter of 0.3 inches for ring portion 52 and a height of approximately 0.145 inches.

With this particular construction, approximately 100 pounds is required to cause legs 53 and 54 to yield and release pin 16, whereas a few pounds or less is the only force required to effect the initial assembly operation. In this view, the connector may be considered substantially nondetachable once assembled in coupling engagement. Of course, special tool means can be provided for releasing legs 53 and 54 from abutments 58 and 59 if desired. Such a tool however, would not be readily available to typical users of the harness system in which the connector of the present invention is employed.

As pin 16 is a load member, it will be observed that shank portion 43 thereof is restrained substantially circumferentially thereabout by the inner perimeter of reduced end 57, the body of ring portion 52 merely serving to transmit forces between pin 16 and the inside wall of opening 18. As opening 18 is formed in this instance within tongue plate 19, which itself is a high strength load member in association with buckle 33, it will be appreciated that the shank of pin 16 is substantially secured against emergency loads. Preferably and as illustrated, the entry to reduced end 57 should be oriented such that a load on shoulder strap 12 is carried by the perimeter of opening 18 at end 57 rather than against legs 53 and 54.

In the disclosed embodiment of the present invention, connector 11 is provided with a rotation limiting washer 71, as best shown in FIG. 5. A central opening 72 in the washer is provided for mounting on shank 43 along with split-ring member 51 at the place of manufacture. The body of washer 71 is disposed adjacent surface 44 of fitting plate 17, spaced from enlarged head portion 48 of the pin by the body of spring member 51 as illustrated in FIG. 4. Washer 71 serves by means of oppositely directed tabs 73 and 74 to limit rotation of fitting plate 17 relative to opening 18, and in this instance relative to tongue plate 19 so as to prevent entanglement and twisting of shoulder strap 12 relative to lap member 27. For this purpose, tab 73 is bent at right angles relative to the plane of the washer so as to extend into one of a pair of holes 76 and 77 of fitting plate 17, depending on whether the harness assembly is installed on the right or left side of the vehicle. A diametrically opposed and oppositely bent tab 74 extends into the plane of opening 18, so as in this instance to abut opposed inside surfaces of legs 53 and 54 to limit the rotation of plate 17. Some freedom of rotation is afforded by virtue of the distance tab 74 may travel before encountering of legs 53 and 54 at the limits of its rotation.

Although the fitting means in the form of bayonet opening 18 is here associated with tongue plate 19 of the lap restraint system, it will be appreciated that non-detachable connector 11 may be provided between the end of shoulder strap 12 and any suitable connecting location along the lap harness 13. For example, a separate load plate can be provided along belt 27, independent of tongue plate 19, and formed with a bayonet-like opening 18 for attachment of plate 17 and pin 16 in the manner described above.

FIGS. 7 and 8 illustrate a preferred alternative embodiment of the present invention, in which a bayonet-like opening 18' is provided with a circumferentially extending insert 81 having folded edges 82 and 83 securing the insert to upper and lower surfaces of a tongue plate 19' in which opening 18' is formed. Opening 18', like opening 18 in the above described embodiment is provided with a relatively enlarged end 56' and a reduced end 57' illustrated.

To provide the unidirectional spring lock means for retaining shank 13' of pin 16', insert 81 is provided with a pair of laterally opposed fingers 86 and 87 struck from insert 81. Fingers 86 and 87 extend inwardly from the circumference of opening 18' intermediate the ends thereof and slope laterally inwardly and toward an entry to the reduced end 57' of the bayonet-like opening. To provide the unidirectional locking, fingers 86 and 87 are laterally flexible and longitudinally rigid such that movement of pin shank portion 43' from the enlarged end 56' toward the reduced end is permitted by a laterally outward camming of fingers 86 and 87 which thus pass the pin into the reduced end 57'. Reverse movement of the pin is however prevented by abutment of the circumference of shank portion 43' against the ends of fingers 86 and 87 as indicated by direction arrows 88 and 89. Insert 81 is made of a suitable material and dimensioned such that fingers 86 and 87 are yielding in a laterally flexible bending mode upon entry of the pin shank and substantially unyielding upon attempted reverse movement of pin 16' in which the outer circumference of shank portion 43 abuts the ends of the fingers in the directions indicated by arrows 88 and 89 and places these fingers in a substantially pure compression mode.

Relative rotation of the fittings is here prevented by a boss 91 formed on the outer circumference of shank portion 43' for mating receipt in an indent 92 formed in the circumference of insert 81 and opening 18' at the reduced end 57' thereof as illustrated.

It is understood that the present invention has been disclosed by reference to two particular and preferred embodiments thereof, and modifications and design changes may be made to the disclosed embodiments without departing from the scope of the invention.

I claim:
1. In a shoulder harness and lap harness safety restraint system, a non-detachable snap-lock connector for permanently attaching an end of a shoulder harness to the lap harness, comprising in combination with said system:
first fitting means affixed to one of said harnesses;
second fitting means affixed to the other harness, said first fitting means being movable into coupling engagement with said second means to connect said fitting means and associated harnesses; and
unidirectional spring lock means associated with said fitting means providing for irreversible locking of said fitting means together upon said movement into coupling engagement.

2. The connector of claim 1 wherein said first fitting means includes a body having a load pin extending outwardly therefrom and said second fitting means includes a load plate having a pin receiving opening therein for receiving said first fitting means pin to establish said coupling engagement, said spring lock means including a spring member means being resiliently deformable by movement of said pin into said plate opening and being permanently unyielding once in place to lock said pin in said coupling engagement.

3. The connector of claim 1 wherein said first fitting means includes a rigid body having a load pin extending outwardly from and being formed with an enlarged head portion offset from said body by a shank portion, said second fitting means including a load plate having an elongate opening enlarged at one end and reduced at the other end to selectively receive and establish coupling engagement with the pin of said first fitting means by passing the head portion transversely through the enlarged end and laterally moving said shank portion into the reduced end, said unidirectional spring lock means including spring member means for disposition in said opening and being engageable with said pin shank affording unidirectional lateral movement thereof from the enlarged end toward and into the reduced end of said opening.

4. The connector of claim 3, said unidirectional spring lock means further including shoulder means disposed at laterally opposed peripheral locations along said plate opening intermediate the ends thereof, and said spring member means comprising a split ring member having the partially enclosed ring portion thereof circumferentially receiving the shank portion of said pin, said pin and split ring spring member adapted to be disposed in the enlarged end of said opening with the split portion of said spring member having legs extending from the ring portion outwardly and away from the reduced end of the plate opening, said legs having their ends cooperating with said shoulder means to assume an initial bending mode in response to urging of said pin shank portion and split ring member into the reduced end of said opening and thereafter being placed in an unyielding compression mode locking said pin shank portion in place.

5. The connector of claim 4, said shoulder means comprising shoulders formed at laterally opposed locations on the peripheral edge of said opening adjacent an entry to the reduced end of said opening and facing toward the rear thereof, said spring member legs adapted to be disposed for assembly with the ends thereof resiliently slidably engaging the circumference of said opening forward of said shoulders relative to the reduced end, whereupon movement of said pin shank portion into coupling engagement with the reduced end causes the leg ends to be driven rearwardly permanently catching on said shoulders and thereby assuming said unyielding compression mode locking said pin shank portion.

6. The connector of claim 4 further comprising a rotation limiting washer having a washer body mounted on said pin and a tab stop fixed to said washer body and being disposed in the plane of said opening to limit rotation thereof and means limiting relative rotation of said washer body and the body of said first fitting means.

7. The connector of claim 6 wherein said washer body is assembled on said pin between said body and plate of said first and second fitting means respectively, and said tab stop is integral with said washer body bent relative thereto to extend into said plate opening, and said means preventing relative rotation of said washer body and first fitting means being provided by another integral tab extending from said washer body into a tab opening provided for the purpose in said first fitting body.

8. The connector of claim 3 said spring member means of said spring lock means comprising at least one finger disposed along the circumference of said opening intermediate the ends thereof, said finger sloping laterally inwardly and toward an entry to the reduced end of said opening and being laterally flexible and longitudinally rigid such that movement of said pin shank portion into the reduced end of said opening is permitted by a laterally outward camming of said finger whereas a reverse movement is prevented by abutment of the pin shank portion against the free end of said finger at the entry to the reduced end.

9. In a method of installing a combination shoulder harness and lap harness safety restraint in a vehicle where the shoulder harness must be permanently connected to the lap harness, the improvement comprising the steps of:
anchoring the shoulder harness and lap harness to the vehicle in separate operations with said harnesses being unconnected, and
subsequently permanently connecting said harnesses by moving first and second fitting means individually affixed to said harnesses into coupling engagement and non-detachably locking said fittings in said coupling engagement by a snap-action unidirectional spring lock means associated with said fitting means.

* * * * *